US010984630B1

(12) United States Patent
Balmer et al.

(10) Patent No.: US 10,984,630 B1
(45) Date of Patent: Apr. 20, 2021

(54) GAMING VOUCHER REDEMPTION KIOSK UTILIZING A RECYCLER, AND GAMING VOUCHER SYSTEM AND METHOD

(71) Applicants: David Balmer, Las Vegas, NV (US); Jay Fraker, Las Vegas, NV (US)

(72) Inventors: David Balmer, Las Vegas, NV (US); Jay Fraker, Las Vegas, NV (US)

( * ) Notice: Subject to any disclaimer, the term of this patent is extended or adjusted under 35 U.S.C. 154(b) by 0 days.

(21) Appl. No.: 15/786,487

(22) Filed: Oct. 17, 2017

Related U.S. Application Data

(60) Provisional application No. 62/527,940, filed on Jun. 30, 2017.

(51) Int. Cl.
*G07F 17/32* (2006.01)
*G07F 7/04* (2006.01)
*G07D 11/13* (2019.01)
*G07F 17/42* (2006.01)

(52) U.S. Cl.
CPC ......... *G07F 17/3225* (2013.01); *G07D 11/13* (2019.01); *G07F 7/04* (2013.01); *G07F 17/3216* (2013.01); *G07F 17/42* (2013.01)

(58) Field of Classification Search
CPC .................................. G07F 17/42; G07F 17/32
See application file for complete search history.

(56) References Cited

U.S. PATENT DOCUMENTS

| | | | | |
|---|---|---|---|---|
| 2004/0145109 | A1* | 7/2004 | Graef | G07F 19/20 271/145 |
| 2004/0164147 | A1* | 8/2004 | Jenkins | G06Q 20/1085 235/382 |
| 2006/0073883 | A1* | 4/2006 | Franks, Jr. | G06Q 30/02 463/25 |
| 2012/0067950 | A1* | 3/2012 | Blake | G07D 9/008 235/381 |
| 2012/0179602 | A1* | 7/2012 | Wheelock | G06Q 20/10 705/39 |
| 2014/0102849 | A1* | 4/2014 | Li | G07D 1/06 194/206 |
| 2014/0332341 | A1* | 11/2014 | Crist | G07D 7/00 194/302 |
| 2015/0356366 | A1* | 12/2015 | Jones | G06K 9/60 382/135 |
| 2017/0011593 | A1* | 1/2017 | Palermo | G07F 17/3225 |
| 2017/0213199 | A1* | 7/2017 | Schwartz | G06Q 20/18 |

* cited by examiner

*Primary Examiner* — Omkar A Deodhar
(74) *Attorney, Agent, or Firm* — FisherBroyles, LLP; Rob L. Phillips

(57) ABSTRACT

A kiosk system including: multiple kiosks forming a network, each of said multiple kiosks comprising: a housing; a processor configured to control operation of the kiosk; a user interface; a gaming voucher and note input and output; a bill validator configured to identify and validate gaming vouchers and notes, the bill validator further configured to accept one or more gaming vouchers and notes simultaneously; a recycler cassette configured to store notes and gaming vouchers; and a note ejector configured to dispense at least notes commensurate with a value of one or more validated gaming vouchers; and a remote server communicatively linked to the multiple kiosks and a casino management system. Using a bill validator and recycler to accept both notes and gaming vouchers provides a more efficient redemption process for both the players and casinos.

15 Claims, 4 Drawing Sheets

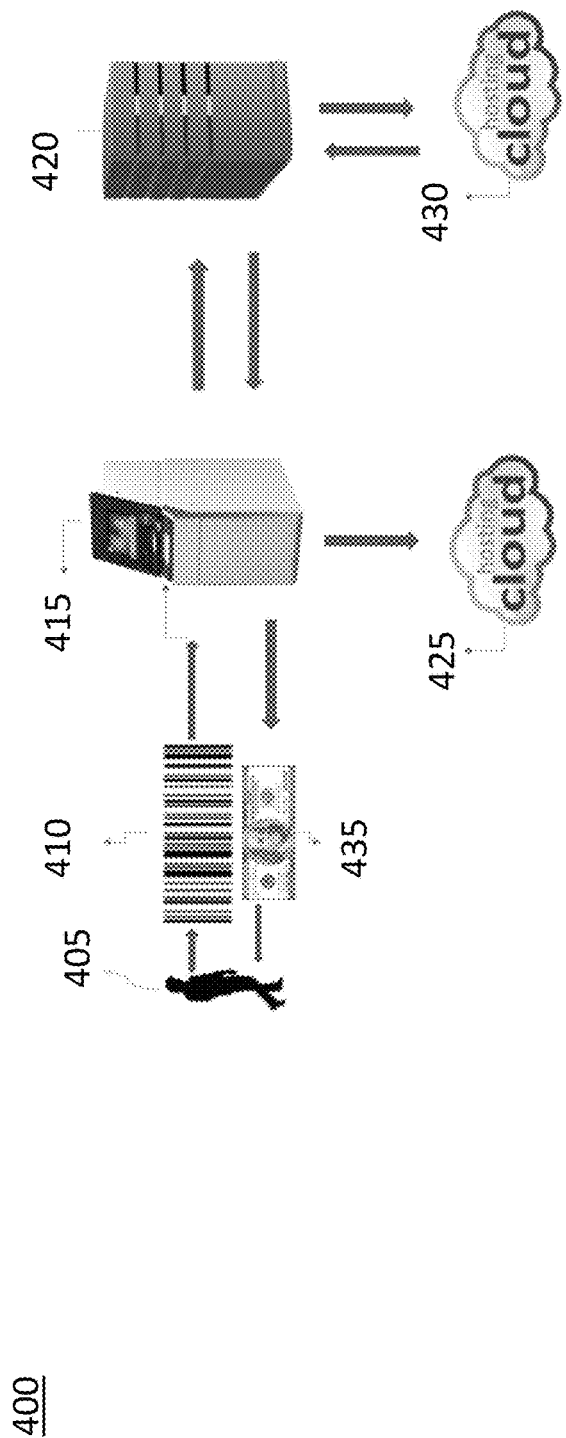

GAMING VOUCHER REDEMPTION KIOSK UTILIZING A RECYCLER, AND GAMING VOUCHER SYSTEM AND METHOD

CROSS REFERENCE

This application claims priority to U.S. Patent Application No. 62/527,940 filed Jun. 30, 2017 which is incorporated for all purposes herein.

FIELD OF INVENTION

The embodiments of the present invention relate to a gaming voucher redemption kiosk, system and method utilizing a modified recycler cassette and bill validator.

BACKGROUND

Gaming continues to grow throughout the United States. One of the most important advances in the casino industry within the past 10-15 years is the incorporation ticket-in, ticket-out (TITO) technology. Such technology has eliminated the need to use coins and currency to play electronic gaming devices (e.g., slot machines). One outgrowth of the proliferation of gaming tickets/vouchers is the need for hardware/software-based redemption systems.

Thus, it would be beneficial to develop a hardware/software redemption kiosk, system and method. Advantageously, the redemption kiosk, system and method should facilitate the redemption of multiple gaming vouchers simultaneously and securely.

SUMMARY

One embodiment of the present invention is directed to a kiosk system comprising: multiple kiosks forming a network, each of said multiple kiosks comprising: a housing; a processor configured to control operation of said kiosk; a user interface; a gaming voucher and note input and output; a bill validator configured to identify and validate gaming vouchers and notes, said bill validator further configured to accept one or more gaming vouchers and notes simultaneously; a recycler cassette configured to store notes and gaming vouchers; and a note ejector configured to dispense at least notes commensurate with a value of one or more validated gaming vouchers; and a remote server communicatively linked to said multiple kiosks and a casino management system.

Another embodiment of the present invention is directed to a method comprising: utilizing a network of kiosks, each kiosk of said network comprising at least a processor, user interface and a gaming voucher and note input and output, and configuring said kiosks for: accepting one or more gaming vouchers and notes simultaneously; identifying and validating said one or more gaming vouchers and notes utilizing a bill validator; storing validated gaming vouchers in a recycler cassette; connecting with a casino management system to authenticate said validated gaming vouchers; requesting notes to dispense commensurate with said authenticated gaming vouchers; validating notes to be dispensed; and dispensing notes commensurate with a value of said legitimate gaming vouchers.

The embodiments of the present invention improve gaming voucher redemption processing at casino-located kiosks and provide a convenience to patrons by redeeming gaming vouchers in bulk as well as individually. The embodiments of the present invention rely on a combination of hardware and software integrated into a kiosk recycler and bill validator.

Other variations, embodiments and features of the present invention will become evident from the following detailed description, drawings and claims.

BRIEF DESCRIPTION OF THE DRAWINGS

FIG. 4 illustrates a schematic representing the beginning of gaming transaction through completion according to the embodiments of the present invention.

DETAILED DESCRIPTION

Figure 1:
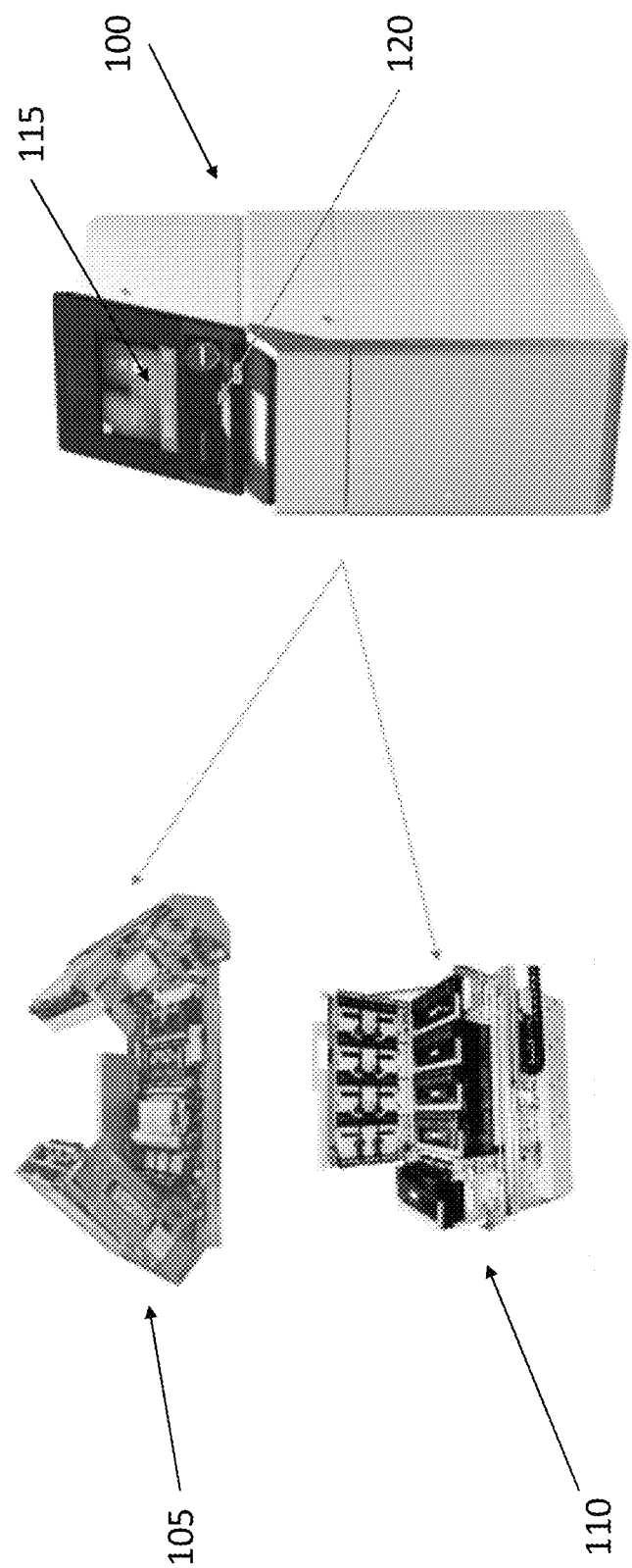
FIG. 1 illustrates a schematic of a voucher redemption kiosk according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a game method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a stand-alone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagrams.

The kiosk 100 detailed herein handles multiple gaming vouchers simultaneously utilizing a recycler configured to validate gaming vouchers and notes. A physical/virtual server located at a casino property authenticates the source of origin, namely the kiosk, as well as the gaming voucher before communicating with a casino or slot management system for final approval/authentication.

FIG. 1 shows a schematic of a voucher redemption kiosk 100 according to the embodiments of the present invention. The kiosk 100 may take on any shape and size desired. The kiosk 100 contains a bill validator 105 configured to read/identify notes and gaming vouchers and a recycler cassette 110 modified to store gaming vouchers and notes. The kiosk 100 further contains conventional internal items such as one or more processors, memory, etc. The kiosk 100 further includes a user interface 115 (e.g., touch screen) and input slot 120 for accepting notes and gaming vouchers and an output slot for dispensing notes. The input slot and output slot may comprise the same slot 120.

Figure 2:
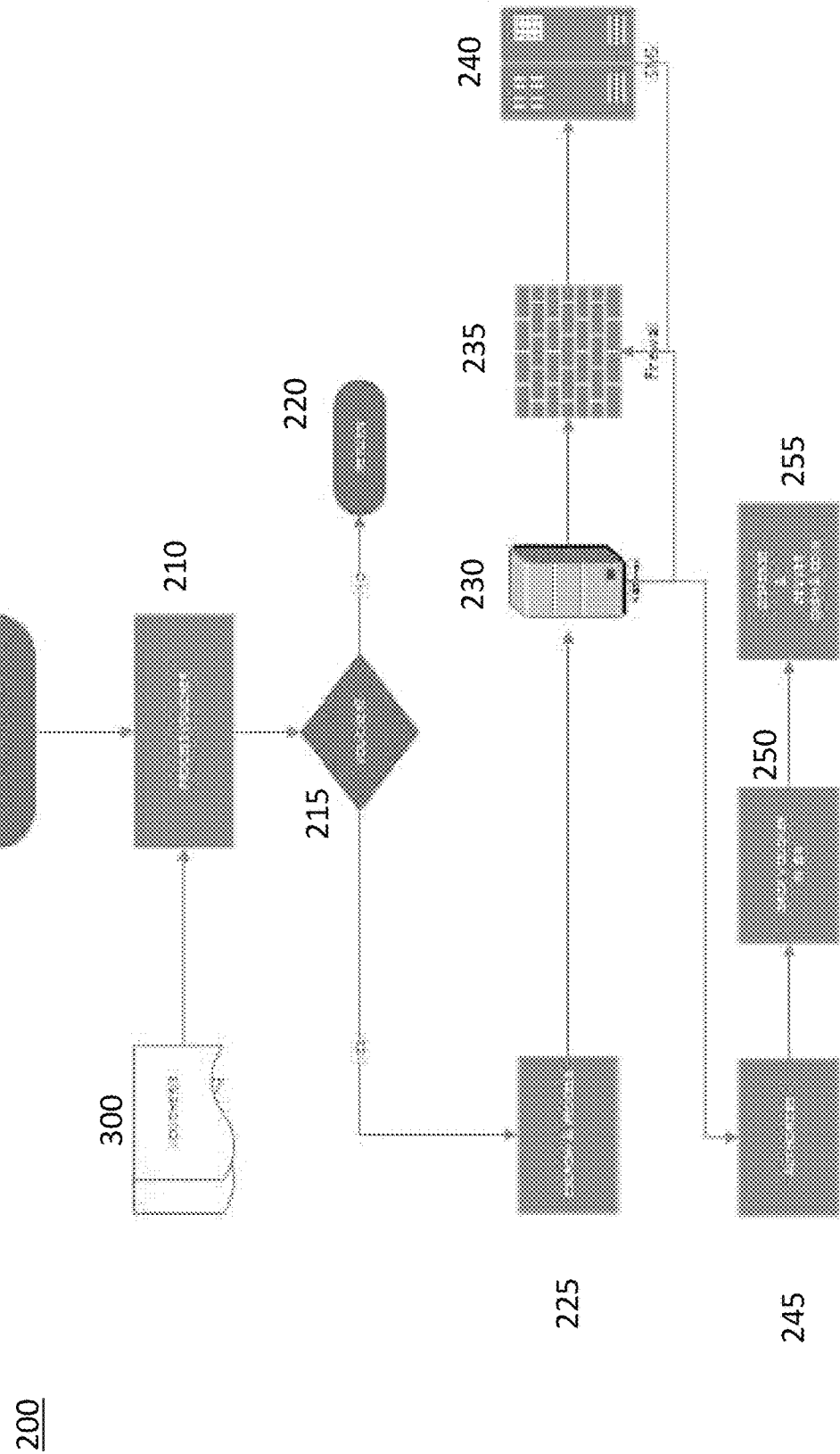
FIG. 2 illustrates a flow chart of a methodology of utilizing voucher redemption system according to the embodiments of the present invention.
Figure 3:
FIG. 3 illustrates an exemplary gaming voucher of the type which may be redeemed using the system according to the embodiments of the present invention.

FIG. 2 shows a flow chart 200 of a methodology of utilizing the voucher redemption system according to the embodiments of the present invention. At 205, the voucher redemption process is initiated when a user inserts one or more gaming vouchers 300 of the type shown in FIG. 3 into a redemption kiosk. As shown in FIG. 3, the gaming vouchers 300 include bar codes 305 (or other codes (e.g., QR code)) which store data associated with the vouchers 300 including values thereof. The monetary value is also printed in text 310 for the holder thereof to immediately know its value. At 210, the gaming voucher redemption process begins. At 215, the system validates that the gaming voucher inserted is in fact a gaming voucher. The validation is accomplished utilizing a bill validator configured to read and identify both notes and gaming vouchers. The bill validator is programmed with proprietary software to read and identify gaming vouchers as well as notes. In one embodiment, the bill validator reads the code on the gaming voucher. In another embodiment, an image of the gaming voucher is captured and transmitted to software configured to read the code or other information on the gaming voucher. If the validation fails, at 220, the gaming voucher is rejected and returned to the user. If the validation succeeds, at 225, the one or more gaming vouchers 300 are escrowed and processed. Once validated, gaming voucher information is transmitted to a dedicated physical/virtual server 230 which communicates with a casino management system/slot/accounting management system 240 or the like through a firewall 235. The casino management/slot/accounting system is responsible for final authentication of the gaming vouchers. If, at 245, the one or more gaming vouchers 300 are authenticated, at 250, the one or more gaming vouchers 300 are dropped into a segregated recycler cassette bin proximate to currency bins of said recycler cassette and, at 255, notes and/or coins are dispensed commensurate with the one or more validated gaming vouchers 300. In an alternative embodiment, rather than dispensing funds, the kiosk may post funds to an electronic account, closed or open loop debit/credit system, smart card, token device, payer account card, e-wallet, slot voucher or other electronic medium.

FIG. 4 shows a schematic 400 representing the beginning of gaming transaction through completion according to the embodiments of the present invention. A patron 405 at a casino first accesses a kiosk 415 to redeem one or more gaming vouchers 410. The kiosk 415 includes an input slot or similar receptor to accept said one or more inserted gaming vouchers 410 and notes. A dedicated physical or virtual server 420 is configured to authenticate said one or more gaming vouchers 410 and source thereof (i.e., the kiosk 415). The authentication of the one or more gaming vouchers is accomplished via communication between the server 420 and casino management system or slot management system 430. The server 420 also stores information in one or more databases, validates kiosk peripherals, etc. A cloud-based or traditional storage system maintains records of all gaming and financial transactions performed at the kiosk 415. Once the one or more gaming vouchers 410 are authenticated and the transaction authorized, notes 435 commensurate with the value of the one or more gaming vouchers 410 are dispensed by the kiosk 415. The one or more gaming vouchers 410 are deposited into a segregated recycler bin.

The kiosk 100 is further configured to determine if there is enough cash before processing the one or more gaming vouchers. In one embodiment, once the one or more gaming vouchers are authorized, the notes are dispensed through the same slot component in which the one or more gaming vouchers were inserted. An authentication mechanism (e.g., a bill reader) is configured to ensure that notes are dispensed and in correct denomination. The authentication mechanism eliminates the inherent problem of cross loading a cash cassette. Cross loading is loading the wrong denomination bill in a cash cassette and therefore dispensing an incorrect amount.

Although the invention has been described in detail with reference to several embodiments, additional variations and modifications exist within the scope and spirit of the invention as described and defined in the following claims

We claim:

1. A kiosk system comprising:
multiple kiosks forming a network, each of said multiple kiosks comprising:
a housing;
a processor configured to control operation of said kiosk;
a user interface;
a gaming voucher and note input and output;
a bill validator configured to identify and validate customer-inserted gaming vouchers and notes, said bill validator further configured to accept one or more gaming vouchers and notes simultaneously;
a recycler cassette configured to store said customer-inserted notes and gaming vouchers in segregated bins, said customer-inserted notes and gaming vouchers stored with any notes and gaming vouchers already stored in the recycler cassette; and
a note ejector configured to validate and dispense at least notes, including, as needed, said customer-inserted notes and any notes already stored in the recycler cassette from said recycler cassette commensurate with a value of one or more gaming vouchers inserted into said kiosk; and
a remote server communicatively linked to said multiple kiosks and a casino management system.

2. The kiosk system of claim 1 wherein said remote server communicates with said casino management system to authenticate gaming vouchers inserted into said multiple kiosks.

3. The kiosk system of claim 1 wherein each of said multiple kiosks is configured to post funds to an electronic account, closed or open loop debit/credit system, smart card, token device, payer account card, e-wallet or slot voucher.

4. The kiosk system of claim 1 wherein said remote server stores gaming and financial transactions performed at each of said multiple kiosks.

5. The kiosk system of claim 1 wherein said remote server is configured to identify a source of said one or more gaming vouchers.

6. The kiosk system of claim 1 wherein said remote server is physical or virtual.

7. A method comprising:
utilizing a network of kiosks, each kiosk of said network comprising at least a processor, user interface and a gaming voucher and note input and output, and configuring said kiosks for:
accepting one or more gaming vouchers and notes simultaneously;
identifying and validating said one or more customer-inserted gaming vouchers and notes utilizing a bill validator;
storing said customer-inserted validated gaming vouchers and notes in segregated bins of a recycler cassette along with any notes and gaming vouchers already stored in the recycler cassette;
connecting with a casino management system to authenticate said validated gaming vouchers;
requesting notes, including, as needed, said customer-inserted notes and any notes already in the recycler cassette from said recycler cassette to dispense commensurate with said authenticated gaming vouchers;
validating said requested notes to be dispensed; and
dispensing notes, including, as needed, said customer-inserted notes and any notes already in the recycler cassette, from said recycler cassette commensurate with a value of said legitimate gaming vouchers.

8. The method of claim 7 further comprising configuring said kiosks for: escrowing validated gaming vouchers and rejecting invalid vouchers.

9. The method of claim 7 further comprising utilizing an intermediary remote server for connecting with a casino management system to authenticate said validated gaming vouchers.

10. The method of claim 9 wherein said intermediary remote server is physical or virtual.

11. The method of claim 9 further comprising configuring said intermediary remote server to identify a source of said one or more gaming vouchers.

12. A kiosk comprising:
a housing;
a processor configured to control operation of said kiosk;
a user interface;
a gaming voucher and note input and output;
a bill validator configured to identify and validate gaming vouchers and notes, said bill validator further configured to accept one or more customer-inserted gaming vouchers and notes simultaneously;
a recycler cassette configured to store said customer-inserted notes and gaming vouchers in segregated bins, said customer-inserted notes and gaming vouchers stored with any notes and gaming vouchers already stored in the recycler cassette; and a note ejector configured to validate and dispense at least notes, including, as needed, said customer-inserted notes and any notes and gaming vouchers already stored in the recycler cassette, from said recycler cassette commensurate with a value of one or more gaming vouchers inserted into said kiosk.

13. The kiosk of claim 12 further comprising a communication link with a remote server, said remote server in communication with a casino management system.

14. The kiosk of claim 13 wherein said remote server is configured to identify a source of validated gaming vouchers.

15. The kiosk of claim 13 wherein said casino management system authenticates validated gaming vouchers.

\* \* \* \* \*